(12) United States Patent
Adib et al.

(10) Patent No.: US 9,753,131 B2
(45) Date of Patent: Sep. 5, 2017

(54) MOTION TRACKING VIA BODY RADIO REFLECTIONS

(71) Applicant: Massachusetts Institute of Technology, Cambridge, MA (US)

(72) Inventors: Fadel Adib, Cambridge, MA (US); Zachary Edward Kabelac, Somerville, MA (US); Dina Katabi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 452 days.

(21) Appl. No.: 14/510,263

(22) Filed: Oct. 9, 2014

(65) Prior Publication Data
US 2017/0082741 A1 Mar. 23, 2017

Related U.S. Application Data

(60) Provisional application No. 61/888,662, filed on Oct. 9, 2013, provisional application No. 61/943,957, filed on Feb. 24, 2014, provisional application No. 61/985,066, filed on Apr. 28, 2014.

(51) Int. Cl.
*G01S 13/42* (2006.01)
*G01S 7/35* (2006.01)
(Continued)

(52) U.S. Cl.
CPC .............. *G01S 13/42* (2013.01); *G01S 7/023* (2013.01); *G01S 7/35* (2013.01); *G01S 7/354* (2013.01);
(Continued)

(58) Field of Classification Search
CPC .......... G01S 13/42; G01S 13/72; G01S 7/415; G01S 7/023; G01S 13/584; G01S 7/354;
(Continued)

(56) References Cited

U.S. PATENT DOCUMENTS 7,916,066 B1  3/2011  Osterweil
9,253,592 B1 *  2/2016  Moscovich ........... H04W 4/008
(Continued)

FOREIGN PATENT DOCUMENTS

EP  2492709  8/2012
WO  2009/047546  4/2009
WO  2013/177431  11/2013

OTHER PUBLICATIONS

Sungchang Choi, Yonggyu Kim and Joongsoo Ma, "Adaptive localization algorithm for movement of mobile node," 2012 14th International Conference on Advanced Communication Technology (ICACT), PyeongChang, 2012, pp. 184-188.*

*Primary Examiner* — John B Sotomayor
(74) *Attorney, Agent, or Firm* — Occhiuti & Rohlicek LLP

(57) ABSTRACT

A motion tracking system makes use of a number antennas to transmit and receive radio frequency signals that are reflected from objects (e.g., people) in the environment of the system, which may include one or more rooms of a building, the interior of a vehicle, etc., and may be partitioned, for example, walls or cloth sheets. In general, the objects in the environment include both fixed objects, such as chairs, walls, etc., as well as moving objects, such as but not limited to people. The system can track people, who may be moving around a room, or may be relatively stationary, for instance, sitting in a chair of lying in bed, but may nevertheless exhibit breathing motion that may be detected. The system may detect body or limb gestures made by the people in the environment, and detect physical activity including detection of falls.

44 Claims, 10 Drawing Sheets

(51) Int. Cl.
*G01S 13/00* (2006.01)
*G01S 13/34* (2006.01)
*G01S 13/58* (2006.01)
*G01S 13/72* (2006.01)
*G01S 13/87* (2006.01)
*G01S 7/02* (2006.01)
*G01S 7/41* (2006.01)

(52) U.S. Cl.
CPC ............ *G01S 7/415* (2013.01); *G01S 13/003* (2013.01); *G01S 13/343* (2013.01); *G01S 13/584* (2013.01); *G01S 13/72* (2013.01); *G01S 13/726* (2013.01); *G01S 13/878* (2013.01)

(58) Field of Classification Search
CPC ........ G01S 13/878; G01S 7/35; G01S 13/003; G01S 13/343; G01S 13/726
USPC ... 342/133, 22, 27, 28, 52, 56, 90, 114, 140, 342/148
See application file for complete search history.

(56) References Cited

U.S. PATENT DOCUMENTS

| | | | |
|---|---|---|---|
| 2003/0209077 A1 | 11/2003 | Battenberg et al. | |
| 2004/0130442 A1* | 7/2004 | Breed | B60C 11/24 340/443 |
| 2007/0139216 A1* | 6/2007 | Breed | G08C 17/00 340/13.24 |
| 2008/0074307 A1 | 3/2008 | Boric-Lubecke et al. | |
| 2008/0316085 A1 | 12/2008 | Rofougaran et al. | |
| 2009/0278728 A1 | 11/2009 | Morgan et al. | |
| 2009/0303108 A1 | 12/2009 | Hilsebecher et al. | |
| 2011/0279366 A1* | 11/2011 | Lohbihler | G01S 5/0247 345/157 |
| 2012/0087212 A1* | 4/2012 | Vartanian | G01S 15/08 367/118 |
| 2012/0116187 A1 | 5/2012 | Hayes et al. | |
| 2012/0185096 A1* | 7/2012 | Rosenstein | B25J 11/009 700/259 |
| 2012/0192617 A1 | 8/2012 | Walton et al. | |
| 2012/0242501 A1* | 9/2012 | Tran | A61B 5/0024 340/870.02 |
| 2012/0250546 A1* | 10/2012 | Hamida | H04L 12/2602 370/252 |
| 2013/0182539 A1* | 7/2013 | Barkin | G01S 15/876 367/99 |
| 2014/0247148 A1* | 9/2014 | Proud | H02J 7/025 340/870.02 |
| 2015/0193938 A1* | 7/2015 | Freedman | H04N 13/0022 382/154 |
| 2015/0269825 A1* | 9/2015 | Tran | G08B 21/0446 340/539.12 |
| 2016/0054804 A1* | 2/2016 | Gollakata | G06F 3/017 345/156 |
| 2017/0082741 A1* | 3/2017 | Adib | G01S 7/35 |

* cited by examiner

MOTION TRACKING VIA BODY RADIO REFLECTIONS

CROSS-REFERENCE TO RELATED APPLICATIONS

This application claims the benefit of
U.S. Provisional Application No. 61/888,662 titled "MOTION TRACKING VIA BODY RADIO REFLECTIONS," filed on Oct. 9, 2013,
U.S. Provisional Application No. 61/943,957 titled "MULTI-PERSON MOTION TRACKING VIA BODY RADIO REFLECTIONS," filed on Feb. 24, 2014, and
U.S. Provisional Application No. 61/985,066 titled "MULTI-PERSON MOTION TRACKING VIA BODY RADIO REFLECTIONS," filed on Apr. 28, 2014.
These applications are incorporated herein by reference.

STATEMENT AS TO FEDERALLY SPONSORED RESEARCH

This invention was made with government support under CNS-1117194 awarded by the National Science Foundation. The government has certain rights in the invention.

BACKGROUND

This invention relates to tracking people via body radio reflections.

Recently, technologies have emerged that can localize a user based purely on radio reflections off the person's body. Challenges related to such technologies include scaling to multiple people, accurately localizing them and tracking their gestures, and localizing static users as opposed to requiring the user to move to be detectable.

Alternative technologies for detecting presence of and/or tracking people in an indoor environment include camera-based approaches in which captured images or video is processed, and ultrasonic or passive infrared motion sensors. Each of these alternative technologies suffers from limited accuracy, computational complexity, privacy concerns, and/or cost of deployment.

SUMMARY

In one aspect, in general, an approach to single or multi-person tracking (including tracking or large-scale and/or small-scale motion) makes use of multiple radio frequency antennas. In some examples, there are multiple transmit antennas and multiple receive antennas, although it should be understood that in other examples, some antennas may be shared between transmitting and receiving, for example, at different times. Generally, in at least some embodiments, localization data is determined by concurrently transmitting signals from multiple antennas, and receiving reflections from the bodies as well as fixed objects (e.g., walls, desks, etc.) at multiple antennas.

In another aspect, in general, a method for indoor localization uses signal reflections from a moving body. The method includes emitting a transmitted signal comprising repetitions of a transmitted signal pattern from a transmitting antenna, and receiving, at each receiving antenna of a set of receiving antennas, a received signal comprising reflections of the transmitted signal. For each received signal, the received signal is processed to form successive patterns of reflections of the transmitting signal pattern from moving bodies, and the successive patterns of reflections are processed by retaining effects of direct reflections from said moving body and excluding at least some effects of multipath reflections from said moving body that are also reflected from at least one static object. A location of the body is determined using a result of processing the successive patterns of reflections.

Aspects may include one or any combination of the following.

For each receiving antenna, excluding multipath reflections includes identifying a direct reflection from the moving body, and identifying indirect reflections from the moving body that also reflect from the at least one static object.

For each receiving antenna, excluding multipath reflections includes identifying a first round-trip time from the transmitting antenna to the receiving antenna, said first round-trip time representing a shortest round-trip propagation time of a signal pattern reflecting from the moving body.

Determining the location of the body includes using the identified first round-trip times for each received signal to eliminating multipath reflections corresponding to round-trip times greater than the identified first round-trip time.

Using the identified first round-trip times comprises tracking said times over successive patterns of reflections.

The set of receiving antennas includes at least three antennas, with at least two antennas having different elevations.

Determining the location of the body comprises determining an elevation of the body.

The method further comprises detecting a pattern of motion in the tracked locations of the body.

Detecting a pattern of motion comprises detecting a temporal pattern of a trajectory of locations of the body.

Detecting a pattern of motion comprises detecting a pattern of motion in an environment of the localization.

Detecting the pattern of motion comprises detecting a gesture.

Detecting the gesture comprises detecting a whole-body gesture.

Detecting the gesture comprises detecting a limb gesture.

Detecting the gesture comprises detecting a pointing gesture.

Detecting a pointing gesture includes detecting a direction of a pointing gesture.

The method further comprises controlling an electrical or electronic device according to the detecting of the gesture.

Controlling the electrical or electronic device comprises controlling at least one of a gaming device, an appliance, and a lighting device.

Detecting the pattern of motion comprises detecting falling activity.

Detecting falling activity comprises monitoring at least one of a change in elevation, a duration of changing elevation of the body, and a proximity of a final elevation to a floor level.

The signal pattern comprises a narrow band signal at a carrier frequency swept from a first frequency to a second frequency.

The first frequency and the second frequency are both in a range of 5.46 to 7.25 gigahertz.

Receiving the received signal includes receiving a reflection of the transmitted signal after propagation through at least one obstruction.

The body is a person.

The body is a limb of a person.

In another aspect, in general a method for interaction with a device uses gestures made by a person. The method includes tracking a motion of a body, including emitting a radio frequency transmitted signal comprising repetitions of a transmitted signal pattern from a transmitting antenna, receiving, at each receiving antenna of a set of receiving antennas, a received signal comprising reflections of the transmitted signal, tracking the location using successive reflections of the transmitted signal pattern. A pattern of motion is detected using the tracked motion of the body. The detected pattern of motion is used to interact with the device.

Aspects may include one or any combination of the following.

The tracking of the motion includes using propagation time of the transmitted signal.

The transmitted signal pattern comprises a Frequency Modulated Carrier Wave (FMCW) signal pattern.

The reflections of the transmitted signal comprise reflections passing through an obstruction.

Detecting the pattern of motion comprises detecting a gesture.

Detecting the gesture includes detecting a two-dimensional gesture.

Detecting the gesture includes detecting a three-dimensional gesture.

Detecting the gesture comprises detecting a whole-body gesture.

Detecting the gesture comprises detecting a limb gesture.

Detecting the limb gesture includes distinguishing a reflection from a limb from a reflection of a whole body of a person according to a size of the reflection.

Detecting the gesture comprises detecting a pointing gesture.

The method further comprises controlling an electrical or electronic device according to the detecting of the gesture.

In another aspect, in general, a method is directed to detecting fall of a person. The method includes tracking a motion of the person, including emitting a radio frequency transmitted signal comprising repetitions of a transmitted signal pattern from a transmitting antenna, receiving, at each receiving antenna of a set of receiving antennas, a received signal comprising reflections of the transmitted signal, tracking the location using successive reflections of the transmitted signal pattern. A pattern of motion is detected using the tracked motion of the body, and the detected pattern of motion is used to detect a fall of the person.

Aspects may include one or any combination of the following.

The reflections of the transmitted signal comprise reflections passing through an obstruction Detecting the pattern of motion comprises monitoring at least one of a change in elevation, a duration of changing elevation of the body, and a proximity of a final elevation to a floor level.

Detecting the pattern of motion comprises monitoring a change of elevation includes detecting a change of elevation of at least a threshold value.

Detecting the pattern of motion comprises monitoring the duration of changing elevation includes detecting a duration less than a threshold value.

Detecting the pattern of motion comprises monitoring proximity of the final elevation includes detecting a final elevation less than a threshold value.

Detecting the pattern of motion comprises detecting when each condition of the group of conditions consisting of a change of elevation of at least a first threshold value, a duration less than a second threshold value, and a final elevation less than a third threshold value, are satisfied.

In another aspect, in general, a system includes a transmitting antenna and a set of receiving antenna. A transmitter is coupled to the transmitting antenna and configured to generate a transmitting signal comprising repetitions of a transmitting signal pattern. A receiver is coupled to the set of receiving antennas, for receiving signals comprising reflections of the transmitting signal. A processor is coupled to the transmitter and to the receiver. The processor is configured to cause the system to perform all the steps of any one of the methods set forth above.

In some examples, the signals transmitted the multiple antennas have narrow frequency band (e.g., sinusoidal waves) with the frequency varying in a fixed pattern between a first frequency and a second frequency, for example, swept from the first frequency to the second frequency linearly changing frequency over time. This swept pattern may be repeated. In some examples, the signals transmitted from different antennas are offset in time from one another (or alternatively offset in frequency), thereby resulting in a received signal at a receiving antenna having components from different transmitters reflected from a body at distinct frequencies.

In some examples, a reference transmit signal is distributed to each of the transmit antennas, and delayed by different times at different transmit antennas. The reference transmit signal is also used at each of the receive antennas to determine propagation (time of flight) times reflecting from bodies from each of the transmit antennas to the receive antenna. In some examples, these propagation times are determined by modulating the received signals by the reference transmit signal. In some examples, the demodulated received signals are averaged (either as complex signals with magnitude and phase, or alternatively averaging magnitude of squared magnitude alone) over a number of sweep cycles to obtain an averaged received signal.

In some examples, rather than distributing the reference transmit signal to each transmit and receive antenna station, a reference timing signal is distributed to the stations, and the reference transmit signal is synthesized separately at each station.

Locations of multiple bodies are determined from the determined propagation times between multiple pairs for transmit antennas and receive antennas.

Aspects can include one or more of the following features.

The effect of a fixed pattern of reflection (e.g., from walls, etc.) is effectively removed from the receive signals, for example, by subtracting a long-term average of the receive signals, or by taking a difference of receive signals from successive frequency sweeps.

The transmit and/or receive antennas are directional antennas.

The antennas are arranged in a fixed arrangement along a line, in a two-dimensional pattern (e.g., in a "T" pattern on a face of a region in which bodies are tracked), or in a three-dimensional arrangement. In some examples, the fixed arrangement is known, while in other examples, the geometric relationship of the antenna locations is inferred using radio propagation time between locations.

In some examples, the antennas are arranged in a room, for example, along a wall or a ceiling. In other examples, the antennas are arranged over multiple rooms of a multi-room space (e.g., a hospital wing or a retail store).

Locations of multiple bodies are determined by iteratively (a) determining a location of a body based on determined propagation times between multiple transmitter-receiver pairs, and (b) having determined a location, effectively removing the effect of reflections from that location from the remaining signals. In some examples, the step of removing the effect of reflections from a location includes removing the effect of reflections from a region around the locations, where that region is determined according to a spatial model of the object causing the reflections (e.g., a model of a human body). In some examples, this iteration is repeated after having identified N bodies in a region by, at each iteration, determining a location for the $n^{th}$ body having removed the effect of the other N-1 bodies in the received signals.

The delays of the reference transmit signal at the various transmitters may be fixed, or may be adapted according to the detected locations of bodies in the environment, for example, according to a maximum range of a detected body.

Breathing of relatively motionless bodies (e.g., humans, pets, etc.) is detected using an oscillation in reflected power from a location of a detected body at a breath frequency. In some examples, the difference between a reference power for a body at a reference time and subsequent power for that body is used to detect the breathing related oscillations.

Complex bodies are detected in three-dimensional space. For example, a human body with limbs extending from a torso (e.g., forming a gesture) may be detected according to a localization of the torso of the body, which may provide a relatively strong reflected energy, and according to a localization of a limb of the body, which may provide a relatively weaker reflected energy, in proximity and/or an appropriate geometric relationship of the detected torso location. More generally, localization of complex bodies may be based on localization of elements of the complex body in geometric relationship based on a model or constraint of the complex body.

In another aspect, in general, a device is used to track three-dimensional motion of one or more humans and body parts from the radio signals reflected off his/her body. The approach works even if the person is occluded from the device or in a different room. The device has one or more antenna for transmission and one or more antennas for receiving. The device transmits a radio signal and uses its reflections to estimate the time it takes the signal to travel from the transmitting antenna to the reflecting object and back to each of the receiving antennas. The device then uses its knowledge of the position of the antennas to create a geometric reference model, which maps the round trip delays observed by the receive antennas to a two-dimensional (or three-dimensional) position of the reflecting body.

In some examples, a technique referred to as Multi-Shift Frequency-Modulated Carrier Wave (FMCW) is used. The technique allows distinguishing between FMCW signals generated from different sources by shifting them in time or in frequency. This distinguishability can be achieved by shifting in time, frequency, or code (e.g., multiplying the signals transmitted from the different antennas by different spreading codes).

In some examples, a technique referred to as Successive Silhouette Cancellation is used. The technique iteratively finds the location of different people in the scene by finding the strongest reflector(s)—i.e., person (or set of persons), removing their effect on the received signals, and then proceeding to find weaker reflectors (persons). Whereas the algorithm is described in the context of localizing people, it can be generalized to localizing any kind of moving or static object.

Whereas the described techniques focus on tracking humans, they can be generalized to tracking any moving (e.g., pets, robots) or static objects.

In another aspect, in general, a method and apparatus is used for distinguishing between frequency modulated carrier wave (FMCW) signal transmitted by different sources. The different sources may be connected to a same or to multiple different devices. In some examples, distinguishability is achieved by shifting the FMCW signals with respect to each other in the frequency domain. In some implementations, shifting in the frequency domain is achieved by mixing with a signal while in other implementations, the shifting in the frequency domain is achieved by adding a delay line. In some alternative implementations, distinguishability is achieved by shifting the FMCW signals with respect to each other by multiplying them with different codes.

The approach to two-dimensional and/or three-dimensional localization uses the signal reflections off one or more bodies or objects. Time-of-flight (TOF) measurements from one or more transmit antennas to each of the receive antennas are computed. Knowledge of the placement of the transmit and receive antennas is used to create a spatial reference that maps time-of-flight to a function of the position of the reflectors. The method includes successively identifying and eliminating the reflections of different objects to focus on weaker or stronger reflectors in the environment in situations in which there are multiple reflectors in the environment.

The antennas may be arranged in various patterns, and in general can be placed in arbitrary locations.

In some implementations, static multipath is eliminated/mitigated by background subtraction. "Fictitious" targets are eliminated by combining the signals from different transmit-receive antenna pairs. For example, the system first finds the strongest reflector, removes it, then re-encodes and proceeds to other reflectors. In some implementations, after finding some (or all) the reflectors, the system proceeds to a focusing step whereby it eliminates interference from unwanted reflectors and focuses on the reflector of interest. This focusing step is used to obtain a better estimate of a reflector's location.

In some implementations, estimated locations are processed to disentangles crossing paths by projecting that targets would move along the same direction after crossing as they did before crossing The system can track body parts, for example to track hand movements. Such tracking can be done in two or in three dimensions. The body part motion may be interpreted as a gesture, and that gesture may be used to control devices or communicate commands.

The system can track movement when multiple people are moving their body parts or where a person or multiple people are moving multiple body parts At least some implements take advantage of practical or physical constraints regarding human motion, like continuity of motion, to improve the localization accuracy In some implementations, breathing motion of humans is used to eliminate static reflectors. For example, multiple subtraction windows are used to identify and/or localize reflectors with different speeds. One or more persons can be localized based on their breathing. In some examples, the system counts the breaths of one or more people, and can detect occasions when one or more people hold their breaths.

In some implementations, additional sensors of different modality (e.g., cameras, infrared sensors, etc.) are combined to improve the accuracy or add functionality.

In some examples, the detected motion of a person or a body part is used to detect patterns, for example, by comparing against known patterns (e.g., a known gesture).

Advantages of one or more aspects can include the following.

Accurate multi-body localization and/or tracking can be achieved with relatively high accuracy in a room, multi-room space (e.g., propagating signals through walls), or other indoor or outdoor regions.

The multi-body localization can provide a count of bodies in a region as compared to mere detection of presence of one or more bodies. Furthermore, accurate trajectories of the bodies are also available, which may not be easily determined using alternative technologies.

As compared to use of cameras, use of radio frequency reflections can provide increased privacy. For example, monitoring presence/traffic in a public bathroom could be accomplished without privacy concerns associated with video monitoring.

Detection of breathing provides a way of detecting a relatively stationary body, which could otherwise be mistaken for background. For example, in an application that monitors presence of people in a room, an ultrasonic motion detector may miss the motionless person whereas their breathing would nevertheless be detected.

Concurrent transmission from all (or sets of multiple fewer than all) transmit antennas can be less affected by motion of a body (e.g., less "smearing" of the estimated location) than sequential transmission from single antennas where the change in location may be significant between transmit times.

Use of a narrow band signal (i.e., a swept tone) provides a direct way of separating the transmissions from different transmitters in a receive signal, and can provide robustness to phase noise.

The approached described above for tracking people can be used to applications including the following:

Security applications to detect people in a building, or taking particular paths in a building;

Energy efficiency approaches based on detected people and longer-term patterns of traffic of people in a building (e.g., energy usage can be based on the number of people in a room rather than mere presence of a person); and Traffic tracking in a retail space, for example, to determine traffic patterns of individual people as they shop in a store.

Monitoring of sleep patterns, detection of sleep apnea, baby monitoring, and other applications of vital sign monitoring have an advantage of not requiring physical sensors or connections to a person.

Other features and advantages of the invention are apparent from the following description, and from the claims.

DETAILED DESCRIPTION

Figure 1:
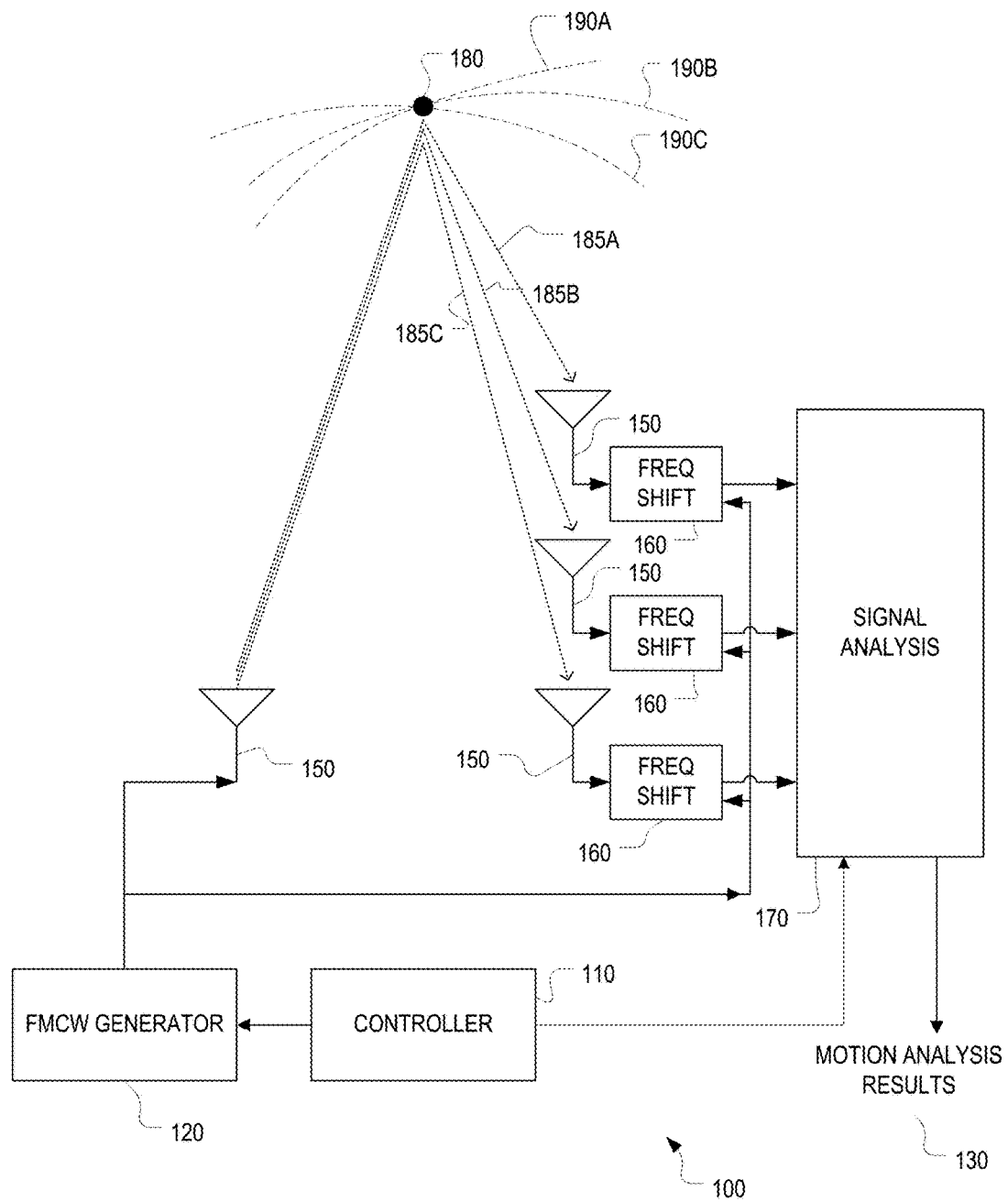
FIG. 1 is a schematic block diagram of a first embodiment of a motion tracking system.

Referring to FIG. 1, a first embodiment of a motion tracking system 100 makes use of a number antennas 150 to transmit and receive radio frequency signals that are reflected from objects (e.g., people) in the environment of the system, which may include one or more rooms of a building, the interior of a vehicle, etc., and may be partitioned, for example, by substantially radio-transparent barriers, for instance building walls or cloth sheets. In general, the objects in the environment include both fixed objects, such as chairs, walls, etc., as well as moving objects, such as but not limited to people. The system can track people, who may be moving around a room, or may be relatively stationary, for instance, sitting in a chair of lying in bed, but may nevertheless exhibit breathing motion that may be detected by one or more embodiments described below. The system provides motion analysis results 130 based on the radio frequency signals. In various embodiments, these results include locations of one or more people in the environment, detected body or limb gestures made by the people in the environment, and detected physical activity including detection of falls.

Generally, the system 100 makes use of time-of-flight (TOF) (also referred to as "round-trip time") information derived for various pairs of antennas 150. For schematic illustration in FIG. 1, three paths 185A-C reflecting off a representative point object 180 are shown between a transmitting antenna and three receiving antenna, each path generally having a different TOF. Assuming a constant signal propagation speed c (i.e., the speed of light), the TOF from an antenna at coordinates $(x_t, y_t, z_t)$ reflecting from an object at coordinates $(x_o, y_o, z_o)$ and received at an antenna at coordinates $(x_r, y_r, z_r)$ can be expressed as $$\frac{1}{c}\left(\sqrt{(x_t - x_o)^2 + (y_t - y_o)^2 + (z_t - z_o)^2} + \sqrt{(x_r - x_o)^2 + (y_r - y_o)^2 + (z_r - z_o)^2}\right)$$

For a particular path, the TOF, for example associate with path 185A, constrains the location of the object 180 to lie on an ellipsoid defined by the three-dimensional coordinates of the transmitting and receiving antennas of the path, and the path distance determined from the TOF. For illustration, a portion of the ellipsoid is depicted as the elliptical line 190A. Similarly, the ellipsoids associated with paths 185B-C are depicted as the lines 190B-C. The object 180 lies at the intersection of the three ellipsoids.

Continuing to refer to FIG. 1, the system 100 includes a signal generator that generates repetitions of a signal pattern that is emitted from the transmitting antenna 150. In this embodiment, the signal generator is an ultra wide band frequency modulated carrier wave (FMCW) generator 120. It should be understood that n other embodiments other signal patterns and bandwidth than those described below may be used while following other aspects of the described embodiments.

Figure 2A:
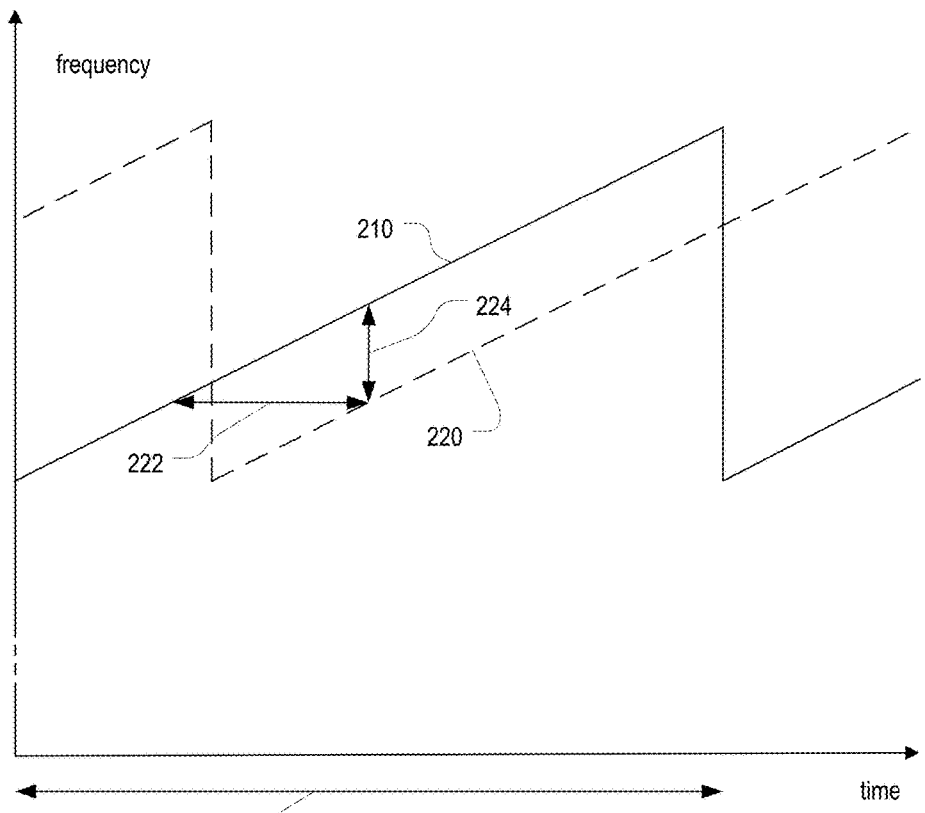
FIG. 2A is a plot of transmit and receive frequency over time.

Referring to FIG. 2A, TOF estimates are made using a Frequency-Modulated Carrier Wave (FMCW) approach. Considering a single transmit and receive antenna pair, in each of a series of repeating time intervals 212 of duration T, a transmit frequency is swept from over a frequency range as shown by solid line 210. In some embodiments, the frequency range is 5.46-7.25 GHz (i.e., a frequency range of approximately 1.8 GHz) with a sweep duration and repetition rate of 2.5 milliseconds. The receiving antenna receives the signal after a TOF 222 (i.e., reflected from a single object), with frequency as shown in the dashed line 220. Note that the TOF 222 corresponds to a difference 224 in transmitted and received frequencies, which is a product of the TOF and the rate of frequency change of the swept carrier for the transmit antenna.

Figure 2B:
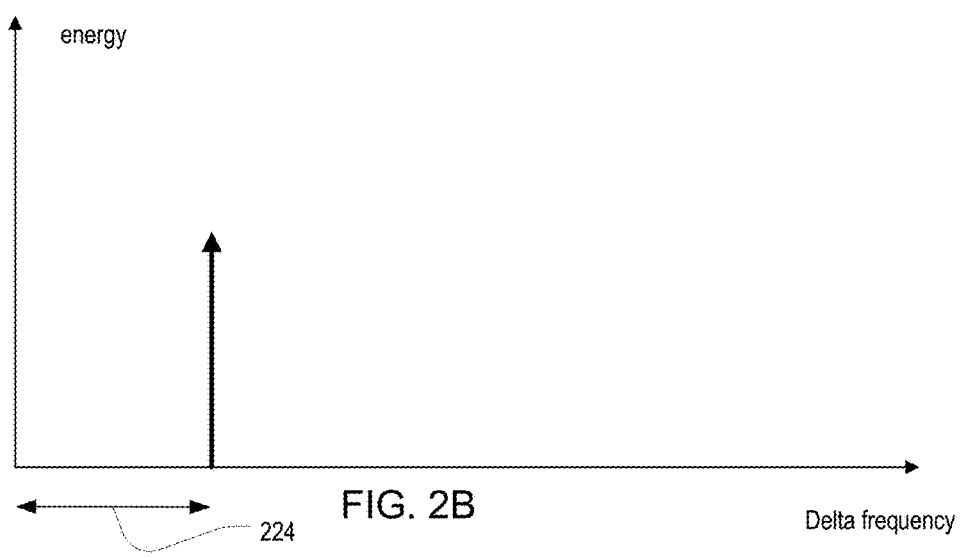
FIG. 2B is a plot received energy over frequency corresponding to FIG. 2A.

Referring to FIG. 2B, if the received reflected signal (dashed line 220 in FIG. 2A) is frequency shifted according to transmitted signal (solid line 210 in FIG. 2A) then the result will have energy concentrated at the frequency difference 224 corresponding to the TOF. (Note that we are ignoring the edges of the intervals 212, which are exaggerated in the figures). Referring back to FIG. 1, a frequency shift component 160 (also referred to as a "downconverter" or a "mixer") implements the frequency shifting, for example, including a modulator that modulates the received signal with the transmitted signal and retaining a low frequency range representing TOF durations that are consistent with the physical dimensions of the environment.

The output of the frequency shifter is subject to a spectral analysis (e.g., a Fourier Transform) to separate the frequency components each associated with a different TOF. In this embodiment, the output of the frequency shifter is samples and a discrete time Fourier Transform implemented as a Fast Fourier Transform (FFT) is compute for each interval 212. Each complex value of the FFT provide a frequency sample with a frequency resolution $\Delta f = 1/T_{sweep}$ where $T_{sweep}$ is the sweep duration (e.g., 2.5 milliseconds).

Continuing to refer to FIG. 2B, it should be recognized that the distribution of energy over frequency (and equivalently over TOF), is not generally concentrated as shown in the diagram. Rather, there is a distribution of energy resulting from the superposition of reflections from the reflective objects in the environment. Some reflection are direct, with the path being direct between the reflecting object and the transmitting and receiving antennas. Other reflections exhibit multipath effects in which there are multiple paths from a transmitting antenna to a receiving antenna via a particular reflecting object. Some multipath effects are due to the transmitted signal being reflected off wall, furniture, and other static objects in the environment. Other multipath effects involve reflection from a moving body, where the path is not direct from the transmitting antenna to a moving object and back to the receiving antenna, but rather is reflected from one or more static objects either on the path from the transmitting antenna to the moving object or from the moving object back to the receiving antenna, or both.

The system addresses the first multipath effect, referred to as static multipath, using a time differencing approach to distinguish a moving object's reflections from reflections off static objects in the environment, like furniture and walls. Typically, reflections from walls and furniture are much stronger than reflections from a human, especially if the human is behind a wall. Unless these reflections are removed, they would mask the signal coming from the human and prevent sensing her motion. This behavior is called the "Flash Effect".

To remove reflections from all of these static objects (walls, furniture), we leverage the fact that since these reflectors are static, their distance to the antenna array does not change over time, and therefore their induced frequency shift stays constant over time. We take the FFT of the received signal every sweep window and eliminate the power from these static reflectors by subtracting the (complex) output of the FFT in a given sweep from the FFT of the signal in a previous sweep. This process is called background subtraction because it eliminates all the static reflectors in the background. In some embodiments, the immediately previous sweep (i.e., 2.5 milliseconds previous), while in other embodiments, a greater delay may be used (e.g., 12.5 milliseconds, or even over a second, such as 2.5 seconds).

By eliminating all reflections from static objects, the system is ideally left only with reflections from moving objects. However, as introduced above, these reflections include both signals that travel directly from the transmitting antenna to the moving body (without bouncing off a static object), reflect of the object, and then travel directly back to the receiving antenna, as well as indirect paths that involve reflection from a static object as well as form a moving object. We refer to these indirect reflections as dynamic multi-path. It is quite possible that moving object reflection that arrives along an indirect path, bouncing off a side wall, is stronger than her direct reflection (which could be severely attenuated after traversing a wall) because the former might be able to avoid occlusion.

The general approach eliminating dynamic multi-path is based on the observation that, at any point in time, the direct signal paths to and from the moving object has travelled a shorter path than indirect reflections. Because distance is directly related to TOF, and hence to frequency, this means that the direct signal reflected from the moving object would result in the smallest frequency shift among all strong reflectors after background subtraction. We can track the reflection that traveled the shortest path by tracing the lowest frequency (i.e., shorted time of flight) contour of all strong reflectors.

Figure 3A:
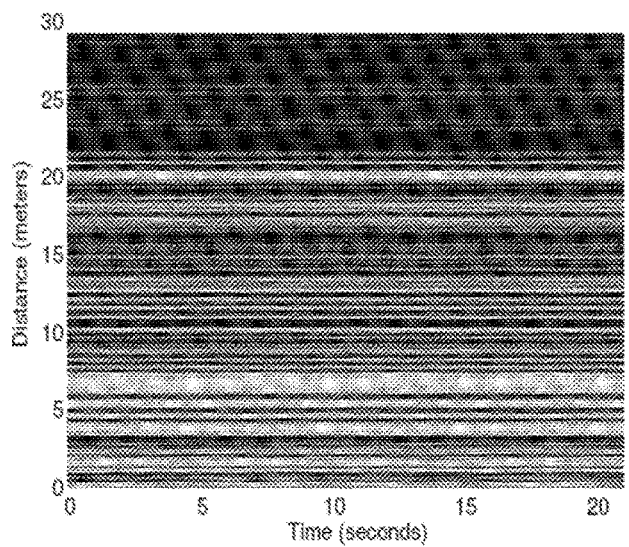
FIG. 3A is a spectrogram (spectral profile versus time) for one transmit and antenna pair.
Figure 3B:
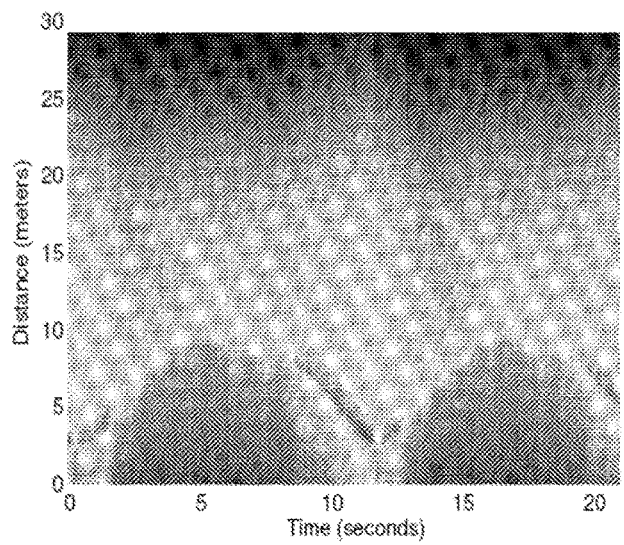
FIG. 3B is spectrogram after background subtraction.
Figure 3C:
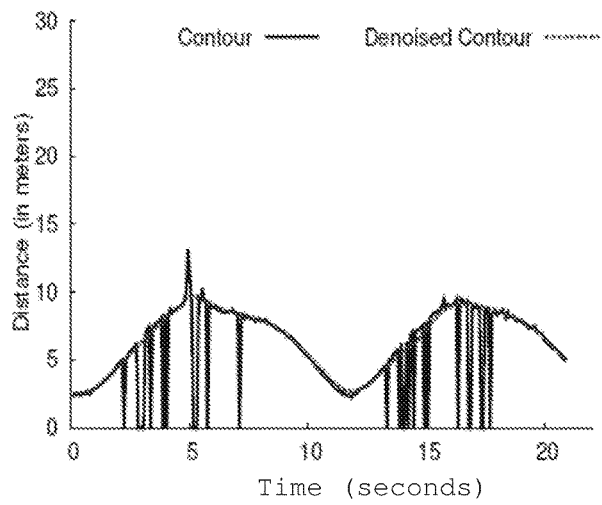
FIG. 3C is a plot of estimates of a first round trip time corresponding to the spectrogram in FIG. 3B.

Referring to FIGS. 3A-C, the horizontal axis of each figure represents a time interval of approximately 20 seconds, and the vertical axis represents a frequency range corresponding to zero distance/delay at the bottom to a frequency corresponding to a range of approximately 30 meters at the top. FIGS. 3A and 3B show FFT power before background subtraction (FIG. 3A) and after background subtractions (FIG. 3B). FIG. 3C shows the successive estimates of the shortest distance (or equivalently time) of flight for successive sweeps, as well as a "denoised" (e.g., smoothed, outlier eliminated, etc.) contour.

To determine the first local maximum that is caused by a moving body, we must be able to distinguish it from a local maximum due to a noise peak. We achieve this distinguishability by averaging the spectrogram across multiple sweeps. In this embodiment, we average over five consecutive sweeps, which together span a duration of 12.5 milliseconds, prior locating the first local maximum of the FFT power. For all practical purposes, a human can be considered as static over this time duration; therefore, the spectrogram (i.e., spectral distribution over time) would be consistent over this duration. Averaging allows us to boost the power of a reflection from moving body while diluting the peaks that are due to noise. This is because the human reflections are consistent and hence add up coherently, whereas the noise is random and hence adds up incoherently. After averaging, we can determine the first local maximum that is substantially above the noise floor and declare it as the direct path to the moving body (e.g., a moving human).

In practice, this approach using the first reflection time rather than the strongest reflection proves to be more robust, because, unlike the contour which tracks the closest path between a moving body and the antennas, the point of maximum reflection may abruptly shift due to different indirect paths in the environment or even randomness in the movement of different parts of a human body as a person performs different activities.

Note that the process of tracking the contour of the shortest time of flight is carrier out for each of the transmitting and receiving antenna pairs, in this embodiment, for the three pairs each between the common transmitting antenna and the three separate receiving antennas. After obtaining the contour of the shortest round-trip time for each receive antenna, the system leverages common knowledge about human motion to mitigate the effect of noise and improve its tracking accuracy. The techniques used include:

Outlier Rejection: the system rejects impractical jumps in distance estimates that correspond to unnatural human motion over a very short period of time. For example, in FIG. 2C, the distance from the object repeatedly jumps by more than 5 meters over a span of few milliseconds. Such changes in distance are not possible over such small intervals of time, and hence the system rejects such outliers.

Interpolation: the system uses its tracking history to localize a person when she stops moving. In particular, if a person walks around in a room then sits on a chair and remains static, the background-subtracted signal would not register any strong reflector. In such scenarios, we assume that the person is still in the same position and interpolate the latest location estimate throughout the period during which we do not observe any motion, enabling us to track the location of a subject even after she stops moving.

Filtering: Because human motion is continuous, the variation in an object's distance to each receive antenna should stay smooth over time. Thus, the system uses a Kalman Filter to smooth the distance estimates.

After contour tracking and de-noising of the estimate, the system obtains a clean estimate of the distance travelled by the signal from the transmit antenna to the moving object, and back to one of the receive antennas (i.e., the round trip distance). In this embodiment that uses one transmitting antenna and three receiving antenna, at any time, there are three such round trip distances that correspond to the three receive antennas. The system uses these three estimates to identify the three-dimensional position of the moving object, for each time instance.

The system leverages its knowledge of the placement of the antennas. In this embodiment, the antennas are placed in a "T" shape, where the transmitting antenna is placed at the crosspoint of the "T" and the receiving antennas are placed at the edges, with a distance of 1 meter between the transmitting antenna and each of the receiving antennas. For reference, the z axis refers to the vertical axis, the x axis is along the horizontal, and with the "T" shaped antenna array mounted to a wall the y axis extends into the room. Localization in three dimensions uses the intersection of the three ellipsoids, each defined by the known locations of the transmitting antenna and one of the receiving antennas, and the round-trip distance.

Note that in alternative embodiments, only two receiving antennas may be used, for example with all the antennas placed along a horizontal line. In such an embodiment, a two dimensional location may be determined using an intersection of ellipses rather than an intersection of ellipsoids. In other alternative embodiments, more than three receiving antennas (i.e., more than three transmitting-receiving antenna pairs) may be used. Although more than three ellipsoids do not necessarily intersect at a point, various approaches may be used to combine the ellipsoids, for example, based on a point that is closest to all of them.

Figure 4:
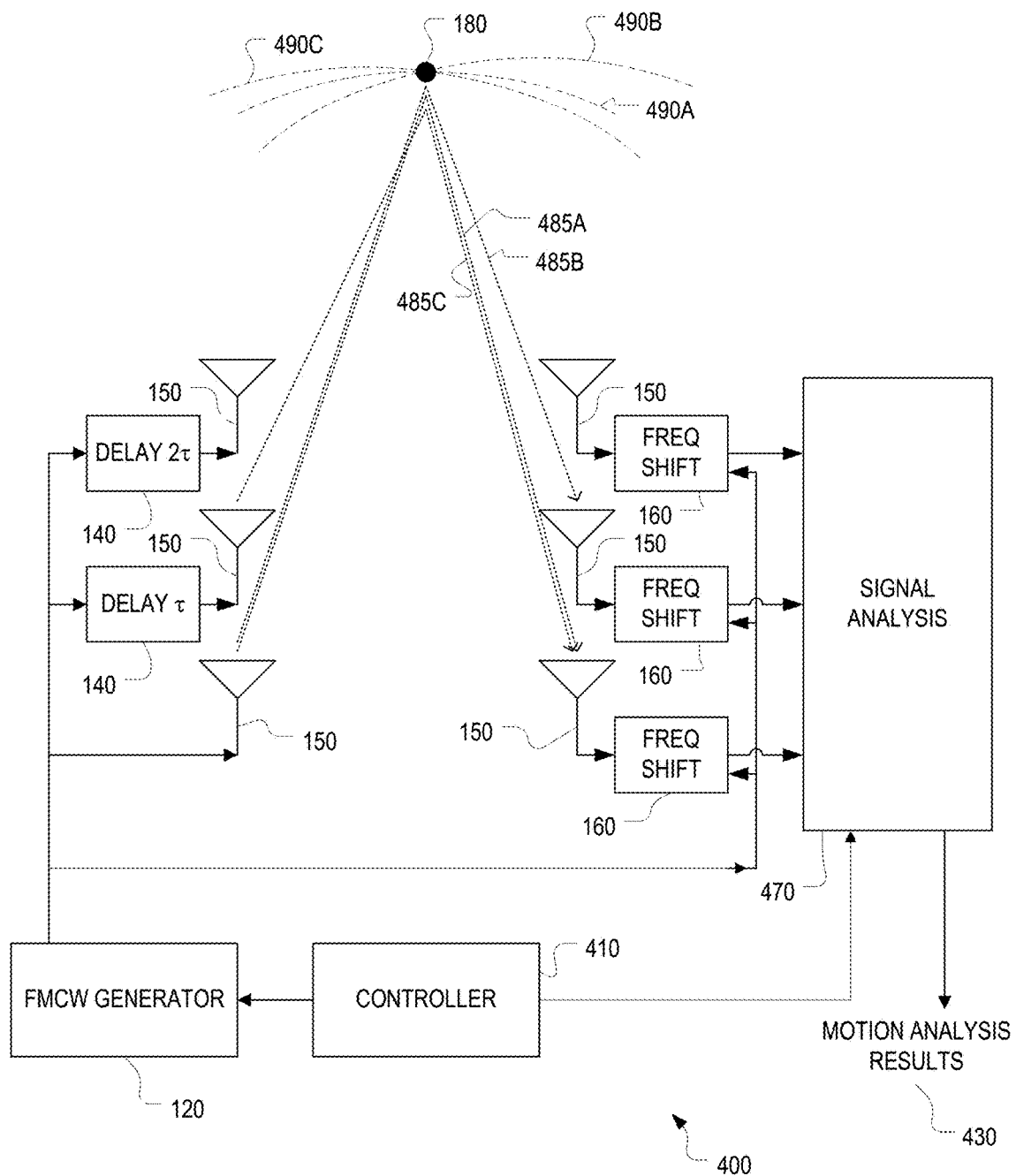
FIG. 4 is a schematic block diagram of a second embodiment of a motion tracking system with concurrent transmission from multiple transmitting antennas.

Referring to FIG. 4, a second embodiment uses concurrent transmissions from multiple transmitting antennas, and also introduces techniques that are applicable to tracking multiple bodies. It should be understood that the approach to using concurrent transmissions is independent of the other techniques. For example, the multiple concurrent transmissions may be used as described in the first embodiment, for example, to track the first time of flight for each antenna pair to mitigate dynamic multipath as described above.

In FIG. 4, three antennas 150 on the left are illustrated as transmit antennas and three antennas 150 on the right are illustrated as receiving antennas. In a preferred embodiment, antennas may be configured in operation to at times act as transmitting antennas and at times act as receiving antennas. Therefore, for N antennas, up to $N(N-1)/2$ different pairs of antennas may be used to determine separate TOF information for a particular object. As described more fully below, the system is operated in a succession of transmit intervals, generally with multiple antennas emitting radio signals concurrently in each interval, and generally multiple antennas receiving reflections of those signals concurrently. The set of transmitting antennas is generally varied from transmit interval to transmit interval, permitting sampling of all the different antenna pairs. In some examples, m antennas are used to transmit in each interval, and (N−m) antennas are used to receive, and up to $m(N-m)$ paths can be evaluated in one time interval. In some examples, $m=\sqrt{N}$, and at least N paths are evaluated per interval. In some examples, $m=N/2$ and up to $N^2/4$ paths are evaluated per interval.

Figure 5A:
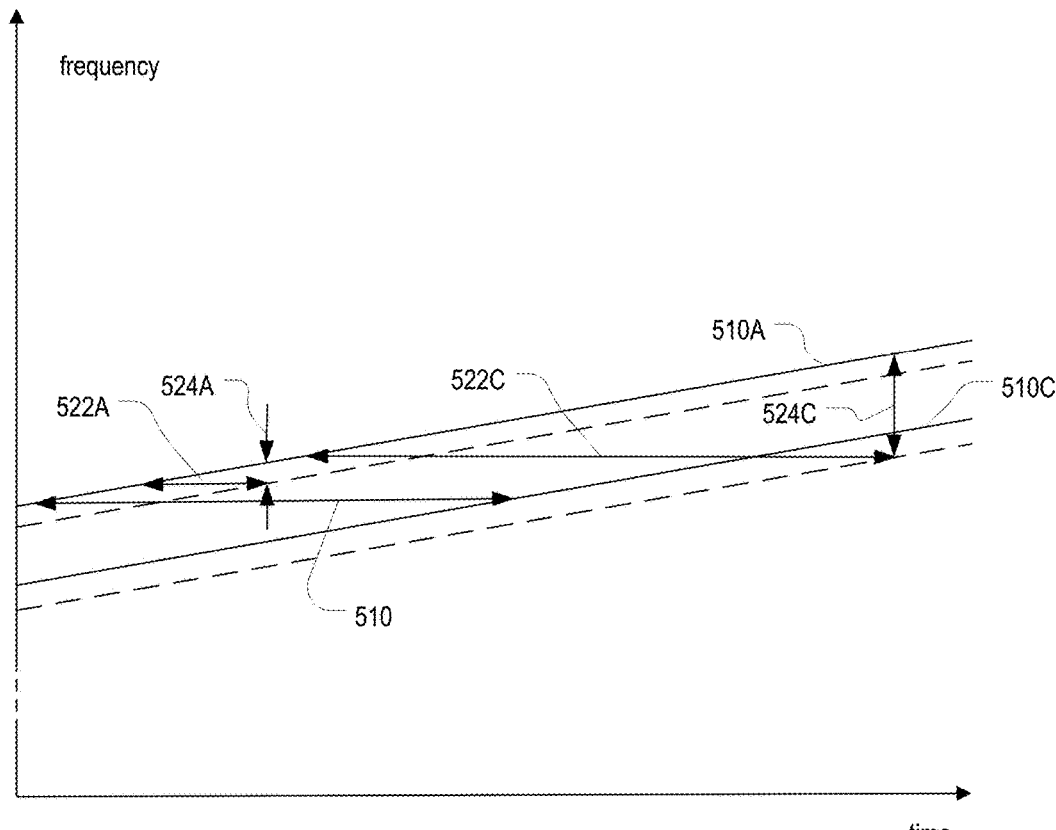
FIG. 5A is a plot of transmit frequencies from two transmit antennas and received frequency at one antenna.
Figure 5B:
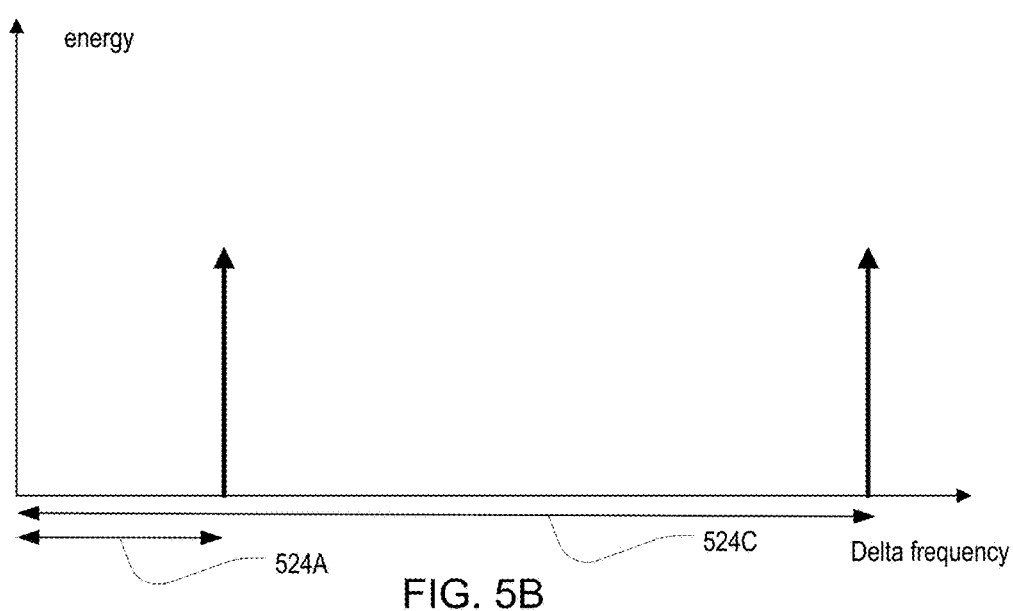
FIG. 5B is a plot received energy over frequency corresponding to FIG. 5A.

Referring to FIGS. 5A, concurrent transmission from two transmit antennas is illustrated over a portion of an interval 212 (i.e, FIG. 5A shows a shorter duration on the time axis than shown in FIG. 2A). A first antenna 150 (see FIG. 4) transmits with a sweep frequency as shown by solid line 510A, which corresponds to line 210 in FIG. 2A. A second antenna transmits the same swept signal with a delay 510 (referred to as r), with this delayed signal is illustrated with solid line 510C. A receiving antenna receives two different reflected signals from the object, one from the first transmitting antenna and one from the second. The reflection of the signal from the first transmit antenna has a TOF 522A as discussed above with reference to FIG. 2A. The reflection of the signal from the second transmit antenna has an apparent TOF of 522C, which is made up of the delay $\tau$ plus the actual TOF from the second transmit antenna to the receive antenna. Referring to FIG. 5A, when the received signal is frequency shifted (i.e., modulated) by the transmit signal from the first antenna (shown as line 510A in FIG. 5A), the energy of the reflection of the first signal is at a frequency 524A corresponding to the TOF 522A from the first transmit antenna, and the energy of the reflection from the second antenna is at a frequency 524C, corresponding to a time 522C equal to the sum of the TOF from the second transmit antenna plus the delay $\tau$ 5310. By choosing $\tau$ greater than the greatest TOF for a direct reflection in the environment, the reflected energy from the second transmit antenna is distinguished from that of the first antenna.

Referring to FIG. 1, delay elements 440 each with a different delay (i.e., an integer multiple of $\tau$) is introduced between a swept carrier signal generated by a FMCW generator 120 and the corresponding antennas selected for transmission to introduce different delays for each of the selected transmitting antennas.

Referring again to FIG. 2B, it should be recognized that the distribution of energy over frequency (and equivalently over TOF), is not generally concentrated as shown in the diagram. Rather, there is a distribution of energy resulting from the superposition of reflections from all the reflective objects in the environment. A more typical energy distribution as a function of TOF is shown in FIG. 4A, which is referred to as a "TOF profile." One way of computing the TOF profile is to band-limit the output of the frequency-shift 160 (i.e., modulator) to the bandwidth of the frequency sweep, and then time sample the band-limited signal, followed by computation of an FFT. The magnitude squared of the (complex) FFT values provides the TOF profile, which each FFT sample corresponding to a different frequency range and therefore to a different TOF range.

Figure 6A:
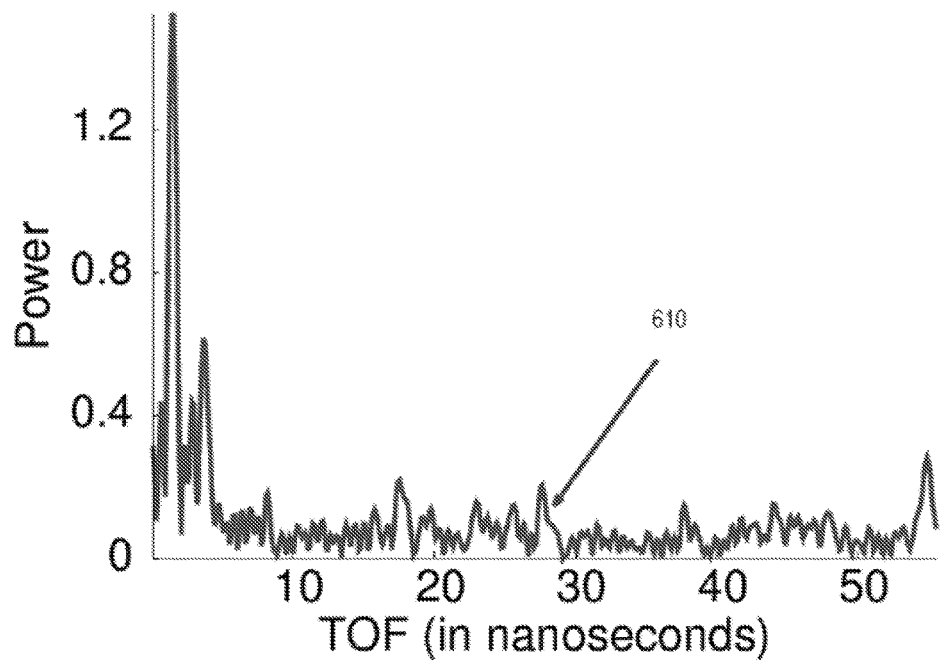
FIG. 6A is a time of flight (TOF) profile.
Figure 6B:
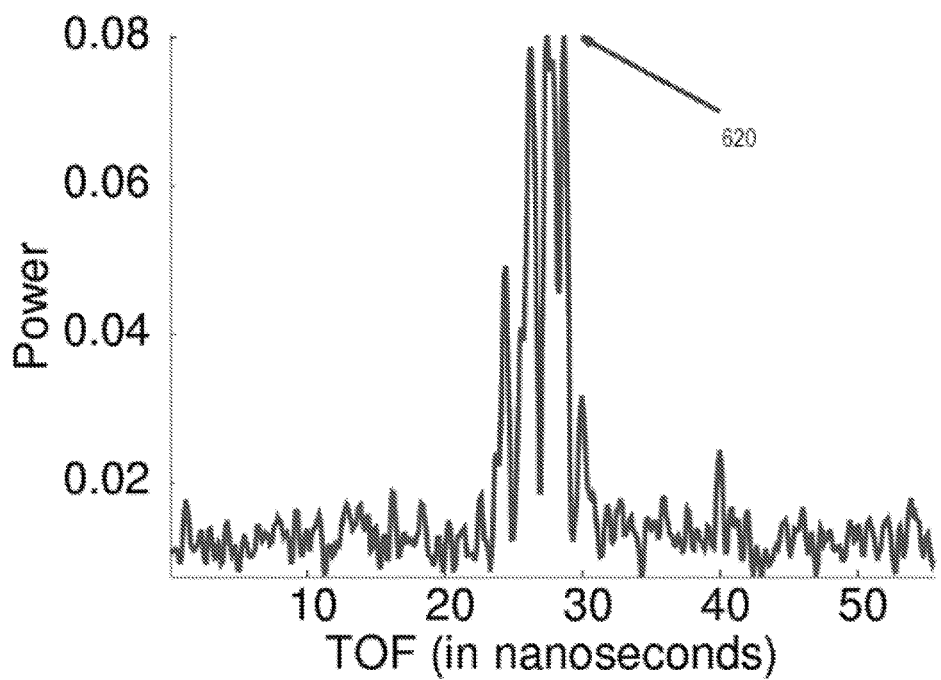
FIG. 6B is a difference TOF profile corresponding to FIG. 6A

In FIG. 6A, the energy 610 at a TOF (approximately 28 nanoseconds) corresponding to a location of a person is not clearly distinguishable in the surrounding reflected energy. However, much of the surrounding reflected energy is from stationary objections. As discussed above, an approach to mitigating the effect of reflections from stationary objects is to identify time variation in the reflected energy, which generally corresponds to moving objects. One approach to identifying this time variation is to compare a the TOF profile (e.g., the complex output of an FFT) obtained at a current time with a delayed version of the TOF profile. For moving people in the environment, a delay of 12.5 milliseconds (e.g., a delay of five 2.5 millisecond sweeps) can be used. This (complex) difference between a current TOF profile and a delayed TOF profile may be averaged over a sequence of sweeps, for example, over five sweeps (e.g., 12.5 milliseconds). Referring to FIG. 6B, an example of application of such a subtraction approach shows an energy peak 620 in a difference TOF profile.

Figure 7A:
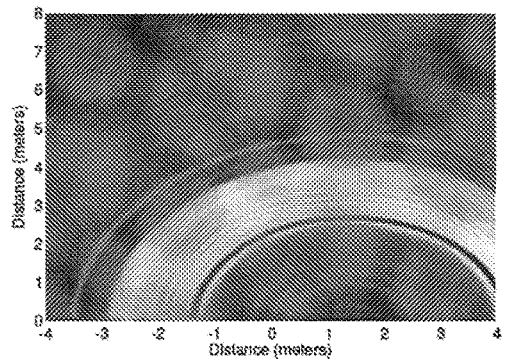
FIGS. 7A-E are "heat maps" formed from difference TOF profiles for one through five transmit-receive antenna pairs, respectively.

As introduced above, each transmit-receive pair of antennas yields one TOF profile. Each point of a TOF profile corresponds to one ellipsoid in three dimensions, or equivalently an ellipse in two dimensions (e.g., if the antennas and the objects are assumed to be in one plane). Therefore, an entire TOF profile may be mapped into a spatial distribution of estimated location, referred to below as a "heat map," by setting the intensity along each ellipse (or ellipsoid) according to each point of the TOF profile. In an example generated with two people were present in an 5 meter by 7 meter room, difference TOF profile using one transmit-receive antenna pair is shown in FIG. 7A. In this examples, all the antennas are spaced along the y=0 axis, and therefore the heat map exhibits variation as a set of half-ellipses, with the foci of the ellipses being at the locations of the antennas used to form the TOF profile.

Figure 7B:
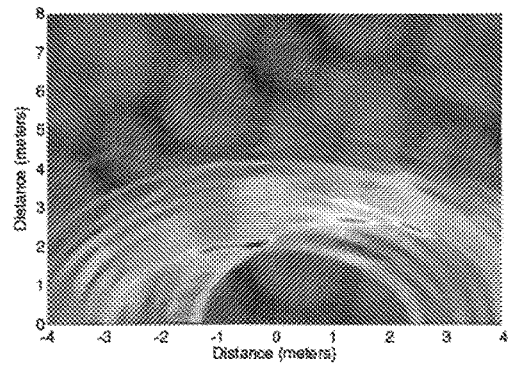
Figure 7C:
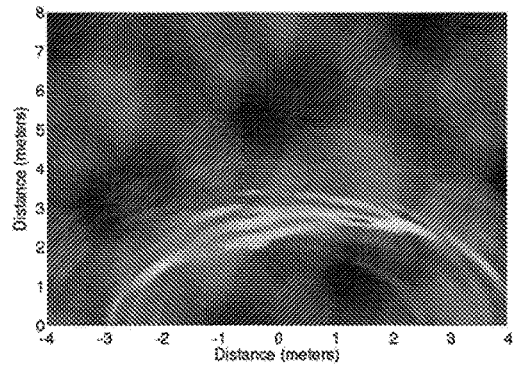
Figure 7D:
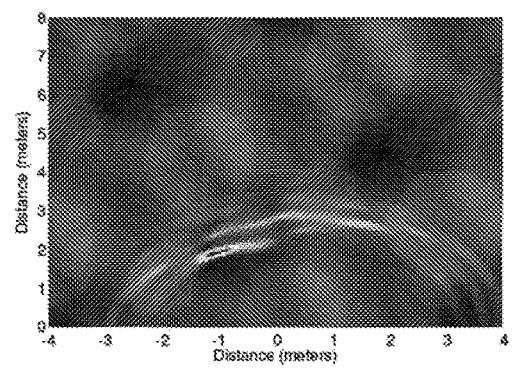
Figure 7E:
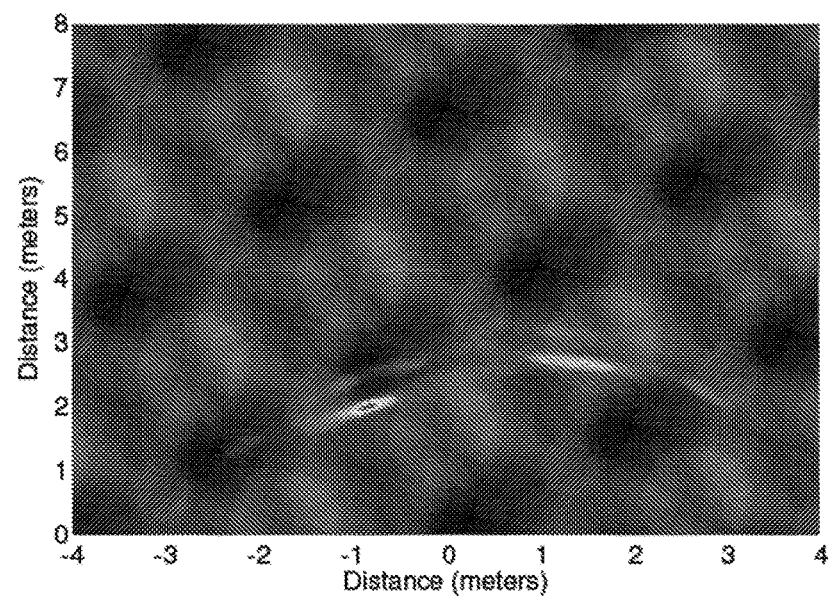

Note that with only one antenna pair as shown in FIG. 7A, the heat mp shows substantial ambiguity of the location of the two people. FIGS. 7B-7E show forming of combined heat maps by summing heat maps from two through five antenna pairs, respectively. Note that with five antenna pairs, as shown in FIG. 7E, locations of the two bodies are evident in the combined heat map. This example uses a two-dimensional heat map approach (e.g., essentially assuming that the antennas and all the object are at the same height). Alternatively, a three-dimensional point cloud, analogous to a two-dimensional heat map (the terms "heat map", "point cloud", and "point map" are generally used interchangeably below), can be computed using the same approach taking into account the three-dimensional coordinates of the antennas.

In practice the combination (i.e., superposition) of heat maps from different antenna pairs as described above may not be sufficient to accurately distinguish the location of bodies (i.e., people) in the environment of the system. One reason is that different users may exhibit a "near-far" problem. Specifically, the reflections of a nearby person are generally much stronger than the reflections of a faraway person or a person behind an obstruction.

Figure 8A:
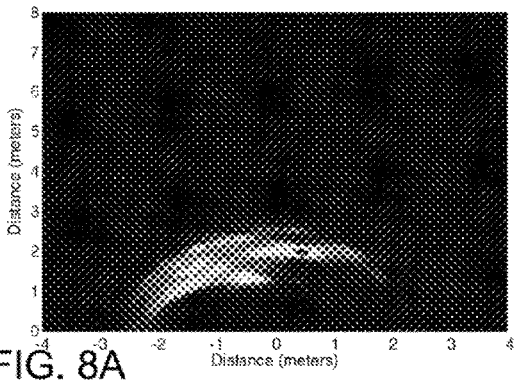
FIG. 8A is an initial heat map.

FIG. 8A illustrates the challenge of the near-far problem, showing the two-dimensional heat map obtained in the presence of four persons in the environment. The heat map allows us to localize only two of these persons: one is clearly visible at (0.5, 2), and another is fairly visible at (−0.5, 1.3). The other two people, who happen to be further away from the antenna array, are completely overwhelmed by the power of the first two persons. To deal with this near-far problem, rather than localizing all the people in one shot, the system performs Successive Silhouette Cancellation (SSC). The SSC procedure consists of four main steps:

1. Detection: find the location of the strongest reflector by overlaying the heat maps derived from the difference TOF profiles for multiple (e.g., all) transmit-receive antenna pairs.
2. Re-mapping: map the detected location to TOF (or a range of TOF) that could have generated that location for each transmit-receive antenna pair.
3. Cancellation: cancel the impact of the person on the TOF profiles of all transmit-receive pairs.
4. Iteration: re-compute the heat maps using the cancelled TOF profiles, overlay them, and proceed step 1. to find the location of the next strongest reflector.

In what follows, we describe each of these four steps in detail by walking through the example with four persons shown in FIGS. 8A-D.

In the first step, Detection, the location of the highest power reflector in the two-dimensional heat map of FIG. 8A. In this example, the highest power is at (0.5, 2), indicating that there is a person in that location.

Given the (x, y) coordinates of a person determined in the Detection step, in the Remapping step, we map this location back to a corresponding TOF range separately for each transmit-receive pair. Although the heat map is computed in two dimensions, each person is not a point reflector and rather has an extent in the vertical (z) direction. Therefore, the effect of reflections off his entire body on the TOF profile of each transmit-receive pair is estimated. For an antenna pair at three-dimensional coordinates $(x_t, y_t, z_t)$ and $(x_r, y_r, z_r)$, the shortest TOF for an object at (x, y) is with a reflection from the three-dimensional point (x, y, $(z_t-z_r)/2$). This TOF(min) is computed using the propagation speed c. The greatest TOF for an object at (x, y) is assumed to correspond to a reflection from the three-dimensional point (x, y, 0), essentially assuming the point at floor level is farthest from the antennas. This TOF(max) is also computed using the propagation speed c. The range [TOF(min),TOF(max)] for each antenna pair is the product of the Remapping step. In other embodiments, other approaches to mapping and (x, y) into a range or other distribution over TOF for each antenna pair may be used, for example, using an estimated mean and standard deviation estimate of the TOF.

The Cancellation step is performed for each antenna pair. In one embodiment, the current TOF profile for an antenna pair is zeroed (or otherwise attenuated) in the estimated range of TOF corresponding to the estimates (x, y) of the person. The combined heat map is then calculated by summing the heat maps determined from the TOF profiles after cancellation. FIG. 7B illustrates the result after performing the procedure on the first person estimated to be at location (0.5, 2.0).

Figure 8B:
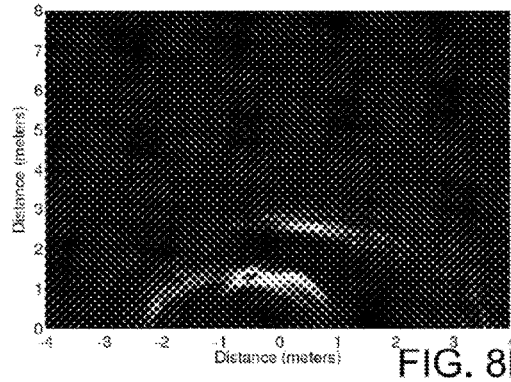
FIGS. 8B-D are heat maps after successive iterations of a silhouette cancellation procedure.
Figure 8C:
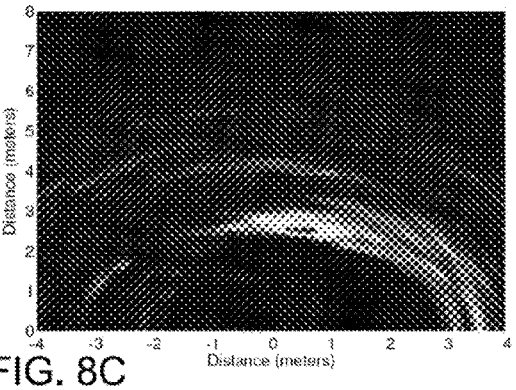
Figure 8D:
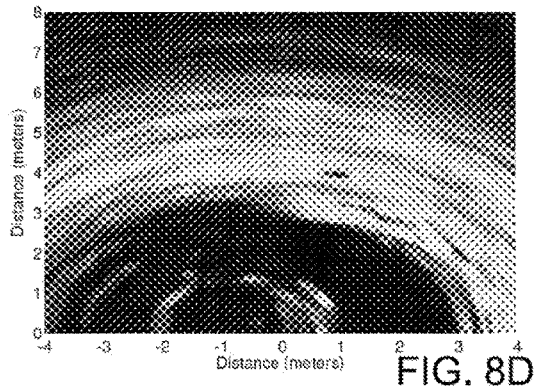
Figure 9A:
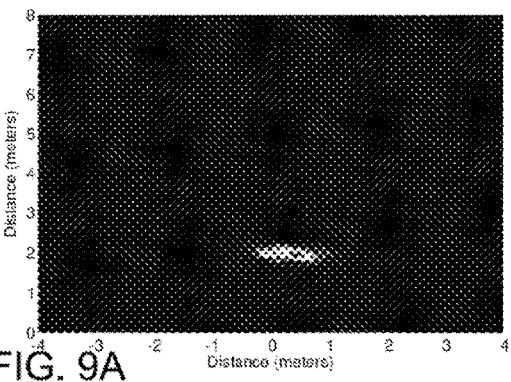
FIGS. 9A-D are heat maps generated by a focusing procedure using locations estimated using the heat maps shown in FIGS. 8A-D, respectively.
Figure 9B:
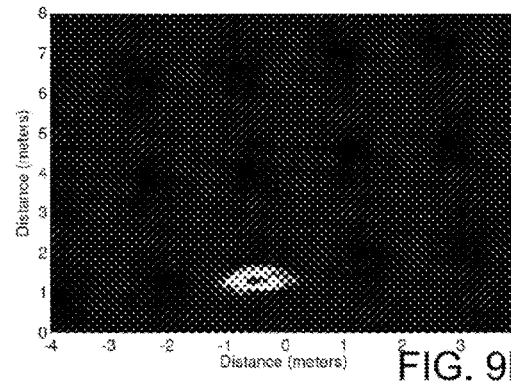
Figure 9C:
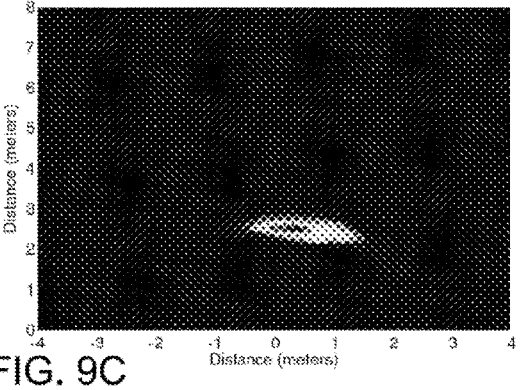
Figure 9D:
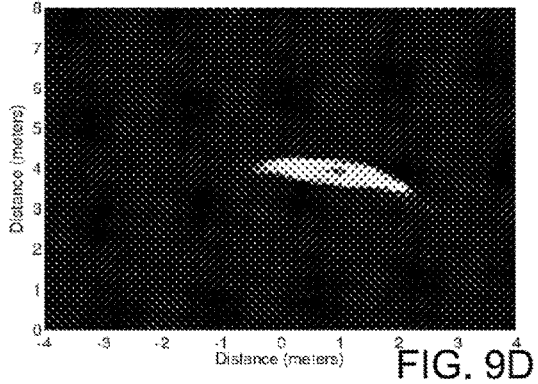

On the second cycle, in step 1 using the heat map of FIG. 8B, a second person is located at position (−0.5,1.3) and the steps are repeated yielding the heat map of FIG. 8C. A third person is located in this heat map at location (0.8,2.7) and the steps are repeated yielding the heat map of FIG. 8D, in which a four person is located at (1.0,4.0).

In some examples, a further Refocusing step is performed to improve the location estimates of the people found in the iteration described above as illustrated in FIGS. 8A-D. For each location at which an object (e.g., person) has been detected, each original TOF profile (i.e., prior to any cancellation in the SSC procedure) is zeroed (or otherwise attenuated) outside its [TOFmin, TOFmax] range corresponding to the estimated location of the object, and these heat maps are combined to form a combined heat map for each person. These refocused heat maps for the four people located in FIGS. 8A-D are shown in FIGS. 9A-D.

In some examples, time sequences of estimated (x, y) locations, or sets of locations, may be further processed. For example, trajectory smoothing and/or assignment of locations to individuals may be performed, for example, using Kalman filtering or other model based or heuristic techniques.

In some examples, the system can differentiate a hand motion from a whole-body motion (like walking) by leveraging the fact that a person's hand has a much smaller reflective surface than his entire body. Using the cancellation and focusing approaches described above, the system can track gestures even when they are simultaneously performed by multiple users. In particular, by exploiting the focusing step, the system focuses on each person individually and track his/her gestures. For example, a pointing gesture, where different users may point in different directions at the same time, can be detected. Subsequently, by tracking the trajectory of each moving hand, the system determines the direction in which each of the users is pointing. Note that the users perform these pointing gestures in three-dimensional and the system tracks the hand motion by using the TOFs from the different transmit-receive antenna pairs to construct a three dimensional point cloud in the refocusing step rather than a two-dimensional heat map.

The approach described above is effective at detecting and estimating the location of moving bodies. In some implementations, as second approach is used instead of or in addition to detect relatively stationary people (e.g., sitting in a chair or lying in bed) based on their periodic breathing motion. In the approach described above, a difference TOF profile for each antenna pair is determined by taking difference over a relatively small time interval, for example, over 12.5 milliseconds. Breathing occurs at a much slower rate, for example, with a breath time of a few seconds. Generally, an approach to detection of breathing people in the environment is based on detecting modulation of the TOF profile over time with a characteristic frequency consistent with breathing. A variety of approaches may be used to detect such modulation for different TOF, for example, by analysis of a series of TOF profiles over a sufficient time scale to detect the modulation. One way to do this is to apply the approach described above, but rather than can computing the different TOF profile with a short time difference (e.g., 12.5 milliseconds), a longer time difference (e.g., over a second, for example, 2.5 seconds) is used.

The SSC procedure described above enables focusing on each person while eliminating interference from all other users. This algorithm proves very effective to monitoring each person's breath in the presence of other people in the environment. Recall that the SSC focusing step allows us to focus on each person while eliminating interference from all other people in the scene (as shown in FIGS. 9A-D). Hence, it allows us to focus on each person individually, and monitor the max power of each person's focused heat map as a function of time. The maximum power from each person's heat map goes up and down periodically. This is because breathing is a rhythmic motion that alternates between inhaling and exhaling. The maximum power is lowest when the person's chest returns to its location in the initial subtraction frame, and is highest when it is at the furthest position from its initial location. We have observed that one person's peak-to-peak signal may be multiple orders of magnitudes higher than that of another person. Nevertheless, the SSC procedure produces a sequence of heat maps shown in FIGS. 9A-D that demonstrates the utility of the procedure in detecting weaker reflections and eliminating interference from other persons in the environment allowing focusing on each person individually and monitoring his/her breathing. This approach allow detection of periods of time when a user stops breathing (e.g., holds his or breath, or as a result of sleep apnea).

There are a great many other potential applications of systems using one or more of the approaches described above, recognizing that references to "the system" above and below are to one or more embodiment of systems that incorporate one or more of the techniques described above. For example, not all systems make use of a each of short time scale differencing, longer time scale differencing, SCC, refocusing, for phase-based processing. Also, as is evident from the context, in some applications, a system may have multiple units each with its own antenna array to monitor large environments.

One potential application relates to energy saving and building automation. The system can identify the number of people in a room or a house and their locations. Therefore the system can be leveraged as an element of a building an automation system that proactively adjusts the temperature in a room based on the number of people or turns off lights/HVAC for empty rooms. This can help in saving energy as well as increase awareness to how people roam around buildings. It could also learn when people come in and when they leave and predicatively turn on, off, or adjust light/HVAC/temperature systems.

There is also a large interest in understanding how employees and visitors use enterprise environments: where they spend most of their time, how teams/groups form and generate ideas, what spaces are unused and what spaces are excessively used, etc. The system (or multiple systems distributed around the enterprise environment) can provide deep insights by tracking employees as well as visitors movements as they roam around spaces. Hence, it can be used to reduce or reorganize the spaces that are not used. Alternatively, it can be used to reorganize spaces where people typically meet and come up with ideas.

In home automation setting, the system can be used for a gesture-based interface whereby a person automates different household appliances by performing a gesture. The system can track the gesture and interpret it as a command; this will allow the person to control appliances such as: turn on and off the TV, write a letter or a word in the air, turn off other household appliances, etc. In addition, the system can learn people's everyday actions and automate tasks. For example, it can learn when a person wakes up (or detect when he/she gets out of bed) and immediately turn on the shower, then when she gets out of the shower, turn on the coffee machine. It can also know when a person is present and hence can determine when she comes into her house. So the system can learn the times at which a person typically returns home (by tracking these patterns across different days) and automatically adjust heating/HVAC/lighting based on previous patterns.

In a retail setting, tracking customers can be used to improve understanding of purchasing behavior. The system can track shoppers in retail stores with very high accuracy providing deep insights into their behavior. It localizes shoppers by relying on radio reflections off their bodies, without requiring them to have a smartphone. It generates wide-ranging in-store analytics such as the number of people who enter/exit the store, the paths they follow, the locations they stop at, and the time they wait in lines to pay. It also tracks hand movements and identifies when a user picks up or returns items to the shelves. These insights provide stores with deep awareness into customer behavior; for example, stores can analyze customer's reactions to their promotion campaigns, and adapt these campaigns in real-time. Further, by understanding customers' trajectories, stores can make products more accessible and more efficiently distribute their staff, thus increasing customer satisfaction, and hence retention. Generally, these analytics enable stores to identify opportunities to increase sales, enhance customer experience and loyalty, and optimize in-store marketing.

There are at least two potential users of the insights that the system can produce for Retail Analytics. First are retail merchandising directors; they increasingly rely on data to determine the most profitable mix of products, pricing and in-store promotions, such as displays, sales support, discounts, etc. Although bricks-and-mortar retail is struggling in the face of competition from e-commerce, leading retailers see a better understanding of customer behavior as the way to stem the bleeding, so spending is shifting to Retail Analytics and is expected to continue to do so over the coming decade.

The second set of Retail Analytics customers are the consumer goods suppliers (CPG companies, primarily). Today, Market Research Directors within CPG companies spend approximately $5.6 Bn per year on market research, including insights from point-of-sale data and customer panel surveys, compiled by research firms such as ACNielsen. Location Analytics insights can help CPG Brand Managers (consumers of the Market Research) to be more efficient with sales promotion spend at retailers.

In health care, the system can track patients as they move about in the hospital. For example, patients fall in their rooms and bathrooms, and it is important to detect when they fall. It may also be important to detect when a patient leaves their room and track them as they move around in the hospital. This becomes even more important in psychiatric sections or psychiatric institutions. Further, because the system can monitor people in general, it can also provide information into visitor waiting times. In additional, it can track if a nurse or another caregiver came into the room and did their responsibility (e.g., checked/changed the patient's vitals)

Senior housing and assisted living facilities strive to offer freedom to their residents and to create an atmosphere focused on enjoying life, rather than being afraid of, so they tend to be wary of adopting any monitoring technology. This includes nursing homes, where the need for care is greater; or to assisted living facilities devoted to patients with dementia. The system can be used to track people (mainly the elderly) in senior housing facilities. It can be used to detect falls, track how many times they used the bathroom or went out of their room or bed, whether they came near the window and received enough sunshine. It can also track the visitors (e.g., their number and actions) when they come into the facility, and the caregivers as they take care (or not take care) of the residents.

The system can also be used for home or enterprise security. Specifically, because it can track human motion, it can know if an intruder enters the building, or even if he is roaming outside the house. For example, it can automatically turn off an alarm or send an alert when someone enters the building when the security system is turned on. Further, even if there are residents inside the house or enterprise and it senses a person roaming around outside the facility, it can detect their presence, track their movements, and/or alert about their presence.

Further details regarding two applications are provided below as examples, recognizing that the approaches described can be applied to a variety of the applications outlined above. These two applications are fall detection and detection of pointing gestures.

For fall detection, an objective is to automatically distinguish a fall from other activities including sitting on the ground, sitting on a chair and walking To do so, we build on the system's elevation tracking along the z dimension. Note that simply checking the person's elevation generally is not sufficient to distinguish falls from sitting on the floor. To detect a fall, the system requires two conditions to be met: First, the person's elevation along the z axis must change significantly (by more than one third of its value), and the final value for the person's elevation must be close to the ground level. The second condition is the change in elevation has to occur within a very short period to reflect that people fall quicker than they sit.

Figure 10:
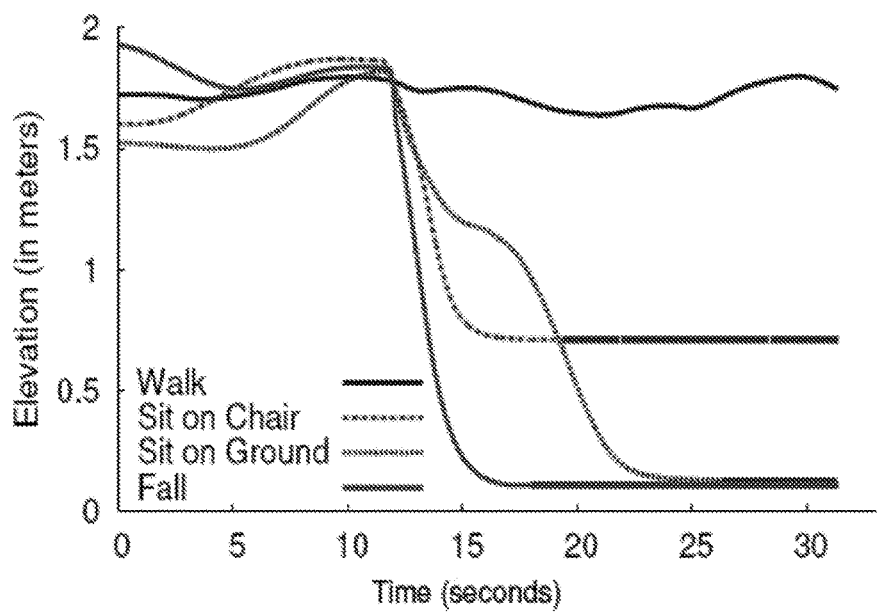
FIG. 10 is a plot of estimated elevation versus time for walking, sitting (in a chair and on the ground), and falling to the ground.

FIG. 10 shows the system's estimate of the elevation along the vertical (z) dimension for four activities: a person walking, sitting on a chair, sitting on the ground, and (simulated) falling on the ground. The figure confirms that walking and sitting on a chair can be identified from falling and sitting on the floor based on elevation because the final elevation is far from z=0. However, to distinguish a fall on the ground from a sitting on the ground, one has to exploit that during a fall the person changes her elevation faster than when she voluntarily sits on the floor.

In applications that make use of a pointing gesture, the system can estimate a pointing angle, which can then be used to control devices such as electrical or electronic devices. Generally, the system first provides coarse estimation of a body part motion, and then further processes that coarse estimate to determine the pointing angle. We consider the following motion: the user starts from a state where her arm is rested next to her body. She raises the arm in a direction of her choice with the intention of pointing toward a device or appliance, and then drops her hand to the first position. The user may move around and at a random time perform the pointing gesture. We require however that the user be standing (i.e., not walking) when performing the pointing gesture. The goal is to detect the pointing direction.

Figure 11:
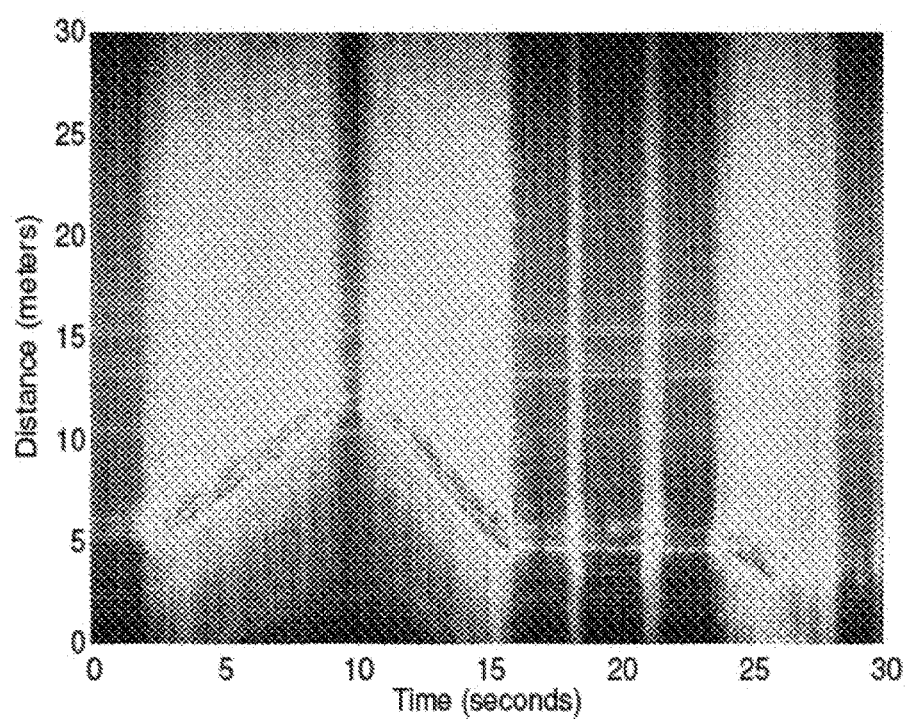
FIG. 11 is a spectrogram of a pointing gesture.

To track such a pointing gesture, the system distinguishes between the movement of the entire body and the motion of an arm. To achieve this goal, we leverage the fact that the reflection surface of an arm is much smaller than the reflection surface of an entire human body. We estimate the size of the reflection surface from the spectrogram of the received signal at each of the antennas. FIG. 11 illustrates the difference between the spectrogram (spectral profile versus time) for one antenna pair when there is a whole body motion and that of an arm pointing. In FIG. 11, the human was moving then stopped and performed the pointing gesture. The two bright spots around 18 seconds and 21 seconds represent the arm being lifted and dropped, respectively. The figure shows that the signal variance along the vertical axis is significantly larger when the reflector is the entire human body than when it is just an arm motion. If the reflector is large, its parts have slightly different positions from each other; hence, at any point in time the variance of its reflection along the y-axis is larger than that of an arm movement. The system uses this spatial variance to detect body part motion from a whole body motion.

Once we detect it is a body part, the system estimates the direction of the motion to identify the pointing direction, which involves the following steps:

Segmentation: The goal of segmentation is to determine the start and end of a pointing gesture. FIG. 11 shows how the system segments the round trip distance spectrogram obtained from each receive antenna. In our pointing experiments, we ask the user to remain static for a second before performing the pointing gesture. Thus, we are able to detect the start of a pointing gesture since it is always preceded by a period of absence of motion. Similarly, after a person raises her arm in a pointing direction, we ask her to wait for a second before resting her arm back to its initial position. Because the system performs a frequency sweep every 2.5 ms, we can easily distinguish the silence at the start and end of a gesture.

Denoising: As is the case for a whole body motion, the contour of the segmented spectrogram is denoised and interpolated to obtain a clean estimate of the round trip distance of the arm motion as a function of time, for each receive antenna.

Determining the Pointing direction: We perform robust regression on the location estimates of the moving hand, and we use the start and end points of the regression from all of the antennas to solve for the initial and final position of the hand. The system estimates the direction of pointing as the direction from the initial state to the final extended state of the hand. Since the user drops her hand after pointing, the system repeats the above steps for this drop motion obtaining a second estimate of the pointing direction. Then, the system estimates the pointing direction as the middle direction between the two. Being able to leverage the approximate mirroring effect between the arm lifting and arm dropping motions adds significant robustness to the estimation of the pointing angle.

Examples of systems that estimate pointing direction can be to enable a user to control household appliances by simply pointing at them. Given a list of instrumented devices and their locations, the system can track the user's hand motion, determine the direction in which she points, and commands the device to change its mode (e.g., turn on or off the lights, or control our blinds).

Figure 12:
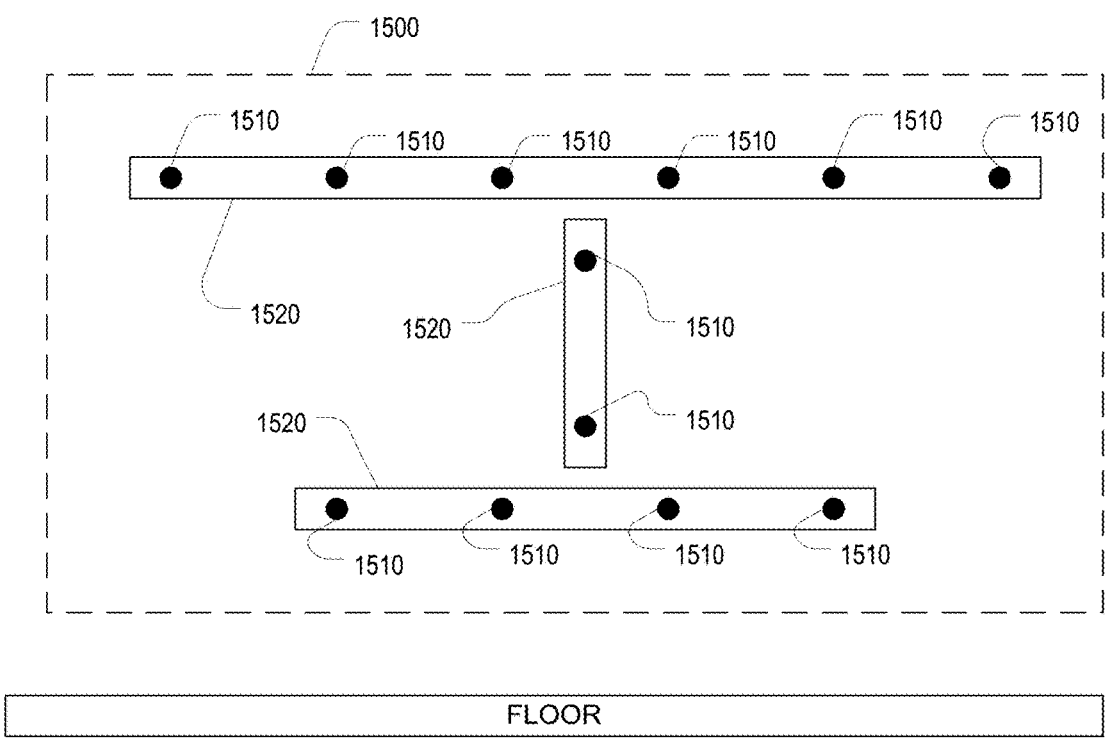
FIG. 12 is a schematic diagram on an antenna array.

The system described above may be embodied in various configurations. For example, the antenna array may form a linear array, multiple linear arrays (for example with a horizontal array and a vertical array in a "T" or inverted "T" shape, of an "H" shape). In other examples, multiple linear arrays may be disposed about the environment. FIG. 12 shows an "H" shaped antenna array 1500 in which antennas 1510 are disposed along a set of linear supports 1520, which are mounted in a plane (e.g., on a wall) above the floor level. In some examples, the antennas are directional, for example, being mounted so that their sensitivity is directed into the room or region being monitored. In some examples, the relative locations of the antennas, and the location of the antenna array in the environment, are known to the system when it is configured by the installer of the system. In some examples, the system monitors direct inter-antenna TOF to infer the relative locations of the antennas, and may monitor static reflections in infer the location of the array within the environment. In some examples, the system monitors propagation time to also estimate delays in electronic paths (e.g., wires, amplifiers, etc.) to that such delays can be subtracted from measured delays to yield the over-the-air propagation times used to estimate locations of reflecting bodies.

It should be understood that the shifting of transmitted signals in time/frequency so that reflections from different transmitting antennas can be distinguished at a receiving antenna is only one possible approach. For example, multiplication by different codes (e.g., orthogonal pseudo-random sequences) can be used at the transmitters and then these codes can be uses to separate the signals at the receivers.

The approaches described above are generally implemented as part of the signal analysis module 170, shown in FIG. 1, and module 470 in FIG. 4. Operation of the signal analysis module is controlled by a controller 110 or 410, which coordinates the selection of transmit and receive antennas, generation of the swept carrier signal by the FMCW generator 120, in addition to coordinating operation of the signal analysis module 170 or 470. In some embodiments, the signal analysis module and/or the controller are implemented in software, for example, including one or more programmable processors that execute instructions stored on non-transitory media (e.g., semiconductor memory) in the system. Implementation of the frequency shift modules 160 may be in hardware, for example, using analog modulation units, or may be implemented using components of a software-defined radio (again controlled by stored software instructions). In some implementations, the analysis may be distributed, with some of the processing being performed on one or more processors in electronics associated with a particular antenna array, while other processing, for example, fusing information from multiple arrays, may be performed at a separate (e.g., central server) computer.

It is to be understood that the foregoing description is intended to illustrate and not to limit the scope of the invention, which is defined by the scope of the appended claims. Other embodiments are within the scope of the following claims.

What is claimed is:

1. A method for indoor localization using signal reflections from a moving body, the method comprising:
    emitting a transmitted signal comprising repetitions of a transmitted signal pattern from a transmitting antenna;
    receiving, at each receiving antenna of a set of receiving antennas, a received signal comprising reflections of the transmitted signal;
    for each received signal,
        processing the received signal to form successive patterns of reflections of the transmitting signal pattern from moving bodies, and
        processing the successive patterns of reflections including retaining effects of direct reflections from said moving body and excluding at least some effects of multipath reflections from said moving body that are also reflected from at least one static object; and
    determining a location of the body using a result of processing the successive patterns of reflections.

2. The method of claim 1 wherein, for each receiving antenna, excluding multipath reflections includes identifying a direct reflection from the moving body, and identifying indirect reflections from the moving body that also reflect from the at least one static object.

3. The method of claim 2 wherein, for each receiving antenna, excluding multipath reflections includes identifying a first round-trip time from the transmitting antenna to the receiving antenna, said first round-trip time representing a shortest round-trip propagation time of a signal pattern reflecting from the moving body.

4. The method of claim 3 wherein determining the location of the body includes using the identified first round-trip times for each received signal to eliminating multipath reflections corresponding to round-trip times greater than the identified first round-trip time.

5. The method of claim 4 wherein using the identified first round-trip times comprises tracking said times over successive patterns of reflections.

6. The method of claim 1 wherein the set of receiving antennas includes at least three antennas, with at least two antennas having different elevations.

7. The method of claim 6 wherein determining the location of the body comprises determining an elevation of the body.

8. The method of claim 1 further comprising detecting a pattern of motion in the tracked locations of the body.

9. The method of claim 8 wherein detecting a pattern of motion comprises detecting a temporal pattern of a trajectory of locations of the body.

10. The method of claim 8 wherein detecting a pattern of motion comprises detecting a pattern of motion in an environment of the localization.

11. The method of claim 8 wherein detecting the pattern of motion comprises detecting a gesture.

12. The method of claim 11 wherein detecting the gesture comprises detecting a whole-body gesture.

13. The method of claim 11 wherein detecting the gesture comprises detecting a limb gesture.

14. The method of claim 13 wherein detecting the gesture comprises detecting a pointing gesture.

15. The method of claim 14 wherein detecting a pointing gesture includes detecting a direction of a pointing gesture.

16. The method of claim 11 further comprising controlling an electrical or electronic device according to the detecting of the gesture.

17. The method of claim 16 wherein detecting the electrical or electronic device comprises controlling at least one of a gaming device, an appliance, and a lighting device.

18. The method of claim 8 wherein detecting the pattern of motion comprises detecting falling activity.

19. The method of claim 18 wherein detecting falling activity comprises monitoring at least one of a change in elevation, a duration of changing elevation of the body, and a proximity of a final elevation to a floor level.

20. The method of claim 1 wherein the signal pattern comprises a narrow band signal at a carrier frequency swept from a first frequency to a second frequency.

21. The method of claim 20 wherein the first frequency and the second frequency are both in a range of 5.46 to 7.25 gigahertz.

22. The method of claim 1 wherein receiving the received signal includes receiving a reflection of the transmitted signal after propagation through at least one obstruction.

23. The method claim 1 wherein the body is a person.

24. The method claim 1 wherein the body is a limb of a person.

25. A method for interaction with a device using gestures made by a person comprising:
    tracking a motion of a body, including emitting a radio frequency transmitted signal comprising repetitions of a transmitted signal pattern from a transmitting antenna, receiving, at each receiving antenna of a set of receiving antennas, a received signal comprising reflections of the transmitted signal, tracking the location using successive reflections of the transmitted signal pattern;
    detecting a pattern of motion using the tracked motion of the body;
    using the detected pattern of motion to interact with the device.

26. The method of claim 25 wherein the tracking of the motion includes using propagation time of the transmitted signal.

27. The method of claim 26 wherein the transmitted signal pattern comprises a Frequency Modulated Carrier Wave (FMCW) signal pattern.

28. The method of claim 25 wherein the reflections of the transmitted signal comprise reflections passing through an obstruction.

29. The method of claim 25 wherein detecting the pattern of motion comprises detecting a gesture.

30. The method of claim 29 wherein detecting the gesture includes detecting a two-dimensional gesture.

31. The method of claim 29 wherein detecting the gesture includes detecting a three-dimensional gesture.

32. The method of claim 29 wherein detecting the gesture comprises detecting a whole-body gesture.

33. The method of claim 29 wherein detecting the gesture comprises detecting a limb gesture.

34. The method of claim 33 wherein detecting the limb gesture includes distinguishing a reflection from a limb from a reflection of a whole body of a person according to a size of the reflection.

35. The method of claim 33 wherein detecting the gesture comprises detecting a pointing gesture.

36. The method of claim 29 further comprising controlling an electrical or electronic device according to the detecting of the gesture.

37. A method for detecting fall of a person comprising:
tracking a motion of the person, including emitting a radio frequency transmitted signal comprising repetitions of a transmitted signal pattern from a transmitting antenna, receiving, at each receiving antenna of a set of receiving antennas, a received signal comprising reflections of the transmitted signal, tracking the location using successive reflections of the transmitted signal pattern;
detecting a pattern of motion using the tracked motion of the body;
using the detected pattern of motion to detect a fall of the person.

38. The method of claim 37 wherein the reflections of the transmitted signal comprise reflections passing through an obstruction.

39. The method of claim 37 wherein detecting the pattern of motion comprises monitoring at least one of a change in elevation, a duration of changing elevation of the body, and a proximity of a final elevation to a floor level.

40. The method of claim 39 wherein detecting the pattern of motion comprises monitoring a change of elevation includes detecting a change of elevation of at least a threshold value.

41. The method of claim 39 wherein detecting the pattern of motion comprises monitoring the duration of changing elevation includes detecting a duration less than a threshold value.

42. The method of claim 39 wherein detecting the pattern of motion comprises monitoring proximity of the final elevation includes detecting a final elevation less than a threshold value.

43. The method of claim 39 wherein detecting the pattern of motion comprises detecting when each condition of the group of conditions consisting of a change of elevation of at least a first threshold value, a duration less than a second threshold value, and a final elevation less than a third threshold value, are satisfied.

44. A system comprising:
a transmitting antenna and a set of receiving antenna;
a transmitter coupled to the transmitting antenna and configured to generate a transmitting signal comprising repetitions of a transmitting signal pattern;
a receiver coupled to the set of receiving antennas, for receiving signals comprising reflections of the transmitting signal;
a processor coupled to the transmitter and to the receiver, configured to cause the system to
emit a transmitted signal comprising repetitions of a transmitted signal pattern from a transmitting antenna;
receive, at each receiving antenna of a set of receiving antennas, a received signal comprising reflections of the transmitted signal;
for each received signal,
process the received signal to form successive patterns of reflections of the transmitting signal pattern from moving bodies, and
process the successive patterns of reflections including retaining effects of direct reflections from said moving body and excluding at least some effects of multipath reflections from said moving body that are also reflected from at least one static object; and
determine a location of the body using a result of processing the successive patterns of reflections.

* * * * *